3,614,906
CUTTING APPARATUS FOR SLITTING MATERIAL

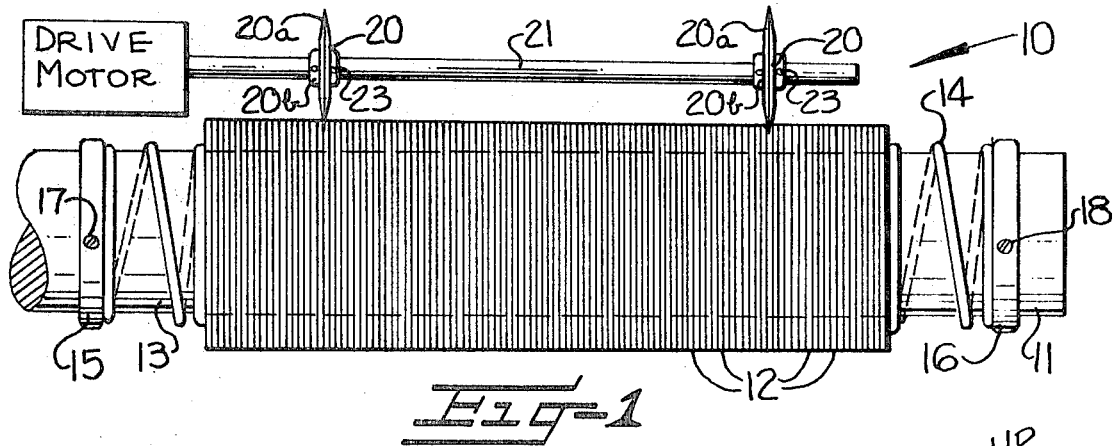
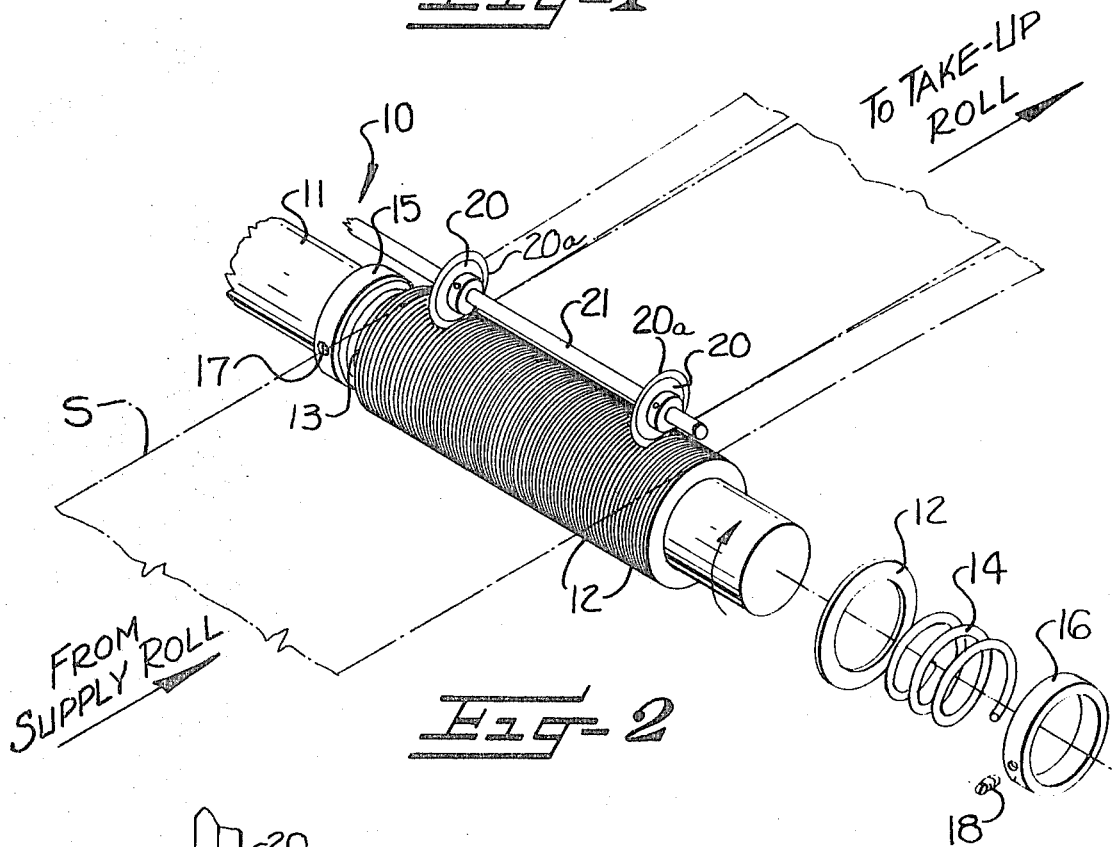
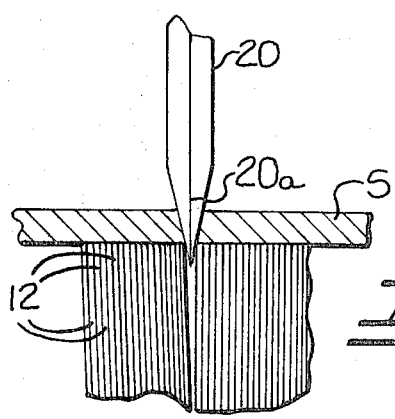

Clyburn E. Hall, Hartsville, S.C., assignor to Sonoco Products Company, Hartsville, S.C.
Filed Sept. 3, 1969, Ser. No. 854,826
Int. Cl. B26d 1/22

U.S. Cl. 83—505                                 7 Claims

ABSTRACT OF THE DISCLOSURE

Cutting apparatus for slitting material comprising an anvil including a plurality of very thin discs, preferably from about .005 inch to about .010 inch thick, coaxially mounted in side-by-side relation and for resilient axial movement relative to each other. At least one rotating cutting blade having an axis of rotation substantially parallel to the axis of the discs is superimposed in cooperative relationship with the discs for slitting material passing therebetween. The cutting edge of the cutting blade is received by and wedged between two of the discs by axially moving the discs relative to each other and passing between the two discs as the cutting blade rotates.

---

This invention relates to a cutting apparatus and more particularly to a cutting apparatus for slitting material of various forms.

Heretofore, cutting apparatus of various types have been employed to slit material. Typically, one or more spaced apart, rotating cutting blades have been superimposed in cooperation with an anvil and between which the material to be slit is passed with the anvil providing a supporting surface for the material as it is slit. However, in such an apparatus in order for the cutting blades to cut completely through the material, it is essential that the cutting edges of the cutting blades cooperate to at least coincide and preferably overlap with the supporting surface of the anvil.

It is readily apparent that if the cutting edges coincide or overlap by contacting the anvil, both the cutting blades and anvil are likely to be damaged, not to mention the detrimental effect upon the material being slit. For instance, the cutting edge may be dulled, the cutting blade may be deflected and frequently broken, and/or the anvil may be marred by the cutting blades, thus, requiring frequent replacement. Accordingly, it is very undesirable for the cutting blades to contact the anvil.

In several instances the anvil has been provided with grooves or slots spaced in receiving communication with the cutting edges of the cutting blades. Similarly, the anvil has been provided to include a plurality of spaced discs, the peripheral edges of which cooperate to provide the supporting surface for the material being slit and wherein the cutting edges of the cutting blades are disposed for communication with the spaces between the spaced discs. While these modifications obviate most of the disadvantages associated with anvils having a smooth and continuous supporting surface, other disadvantages are presented. For instance, it is absolutely essential that the cutting blades be disposed in specified positions relative to the anvil which requires skilled manual labor and additionally, places strict limitations on the positions at which the material may be slit. Furthermore, the supporting surface of the anvil is made irregular which in itself can present numerous problems.

Thus, it is an object of the present invention to provide an improved cutting apparatus for slitting material including one or more rotating cutting blades superimposed in cooperation with an anvil wherein the cutting edges of the cutting blades are received by the anvil without damage to the cutting blade or the anvil and wherein it is not necessary to position the cutting blades in any prescribed position relative to the anvil and wherein the anvil otherwise provides a smooth and continuous surface for supporting the material as it is being slit.

The foregoing object and others are accomplished by providing an anvil including a plurality of very thin discs, preferably from about .005 inch to about .010 inch thick, coaxially mounted inside-by-side relation with the peripheral edges of the discs cooperating to provide a smooth and continuous supporting surface for the material to be slit and means mounting the discs for resilient axial movement relative to each other, and one or more rotating cutting blades having a cutting edge on the outer periphery thereof and an axis of rotation substantially parallel to the axis of the discs and being superimposed in cooperative relationship with the discs for slitting material passing therebetween with the cutting edges of each of the cutting blades being received and wedged between two of the discs by axially moving the discs relative to each other and passing between the discs as the cutting blades rotate.

Some of the objects of the invention having been stated, other objects will appear as the description proceeds, when taken in connection with the accompanying drawings, in which:

FIG. 1 is a schematic front elevational view with portions broken away of a cutting apparatus of the present invention;

FIG. 2 is a reduced schematic perspective view with portions broken away and portions exploded of the cutting apparatus of FIG. 1 illustrating slitting of material; and FIG. 3 is an enlarged front elevational view with parts in section of a fragmentary portion of the cutting apparatus of FIG. 2 illustrating the slitting of the material with one of the cutting blades.

Referring more specifically to the drawings wherein like reference characters are used to indicate like parts, there is illustrated in the various figures a cutting apparatus, generally indicated at 10, of the present invention for slitting elongate sheet material S such as paper, plastic and the like.

The cutting apparatus 10 comprises anvil means which includes a rotating shaft 11 supported in any suitable manner (not shown) for rotation by any conventional drive means (not shown). A plurality of very thin identical cylindrical annular discs 12 having an internal diameter slightly greater than the diameter of the rotating shaft 11 are coaxially mounted on rotating shaft 11 in side-by-side relation for sliding axial movement thereon. The outer peripheral edges of the discs 12 cooperate to provide a smooth and continuous supporting surface for the sheet material S to be slit. As indicated, the discs 12 are very thin and, preferably, have a thickness from about .005 inch to about .010 inch for reasons to become apparent upon further description of the cutting apparatus 10.

The anvil means further includes biasing means operatively connected with the rotating shaft 11 and mounting the plurality of side-by-side discs 12 for resilient axial movement thereon relative to each other. The biasing means comprises a pair of compressible coil springs 13 and 14 coaxially mounted on the rotating shaft 11 at opposed ends of the plurality of discs 12. One end of each coil spring 13 and 14 is disposed in abutting relation to the opposed ends of the plurality of discs 12. The coil springs 13 and 14 are maintained in a partially compressed condition by a pair of collars 15 and 16 which abut the other end of the coil springs 13 and 14 and are secured to rotating shaft 11 by set screws 17 and 18, respectively. Thus, coil springs 13 and 14 resiliently maintain the plurality of discs 12 in side-by-side relation and allow the discs 12 to be resiliently moved relative to each other axially of the rotating shaft 11. Furthermore, the frictional engagement of the discs 12 with the rotating shaft 11 and the resilient connection of the discs 12 to the rotating shaft 11 mount the discs 12 for rotation with the rotating shaft 11. It will be readily apparent that the position of the collars 15 and 16 may be varied somewhat along the rotating shaft 11 to vary the resilient force necessary to move the discs 12 axially of the rotating shaft 11.

At least one and preferably a plurality of spaced apart, rotating cutting blades 20 having a cutting edge 20a on the outer periphery thereof and an axis of rotation substantially parallel to the axis of the discs 12 are superimposed in cooperative relationship with the plurality of discs 12. More particularly, a rotating cutting blade shaft 21 is supported for rotation by any suitable means (not shown) substantially parallel to the axis of the shaft 11 and the discs 12 in superimposed relation therewith. The rotating cutting blade shaft 21, as shown, may be rotated by any conventional drive motor, generally indicated at 22. The cutting blades 20 are coaxially mounted thereon in spaced apart relation. Each of the cutting blades 20 include collar portions 20b having set screws 23 which communicate with cutting blade shaft 21 and mount the cutting blades 20 for rotation therewith. Furthermore, by releasing the set screws 23, the cutting blades 20 may be adjusted axially along cutting blade shaft 21. Thus, any number of cutting blades 20 may be mounted on the cutting blade shaft 21 at any desirable spaced apart positions therealong.

As illustrated, in the various figures, particularly FIG. 3, the cutting edges 20a of the cutting blades 20 cooperate with the plurality of discs 12 with the cutting edges 20a of each of the cutting blades 20 being received by and wedged between two of the very thin discs 12 by axially moving the discs 12 relative to each other and passing between the two discs 12 as the cutting blade 20 rotates. A particular advantage to be appreciated in the present cutting apparatus 10 is that irrespective of the position of the cutting blades 20 along the rotating cutting blade shaft 21, the discs 12 are sufficiently thin that the cutting edges 20a may be received and wedged between two of the side-by-side discs 12 without substantial likelihood of abutting the peripheral edge of one of the discs 12. In this regard, it has been found that discs 12, as previously indicated, should be of a thickness from about .005 inch to a maximum of about .010 inch to best serve this purpose.

In operation, the cutting blades 20 are positioned along the rotating cutting blade shaft 21 at the desired slitting positions. Sheet material S such as paper, plastic and the like is fed between the cutting blades 20 and the supporting surface formed by the plurality of side-by-side discs 12. The sheet material S may be fed from any convenient source, such as a supply roll (not shown), through the apparatus to any convenient collection means, such as take-up roll (not shown), driven by any conventional driving means (not shown).

Preferably, both the cutting blades 20 and the discs 12 are rotated in the same direction as the sheet material S is fed therebetween with the peripheral edges of the plurality of discs 12 moving at substantially the same speed as the sheet material S for apparent reasons. Also, it is preferred that the cutting blades 20 be rotated at a sufficiently high speed such that cutting edges 20a move at a much higher speed than the sheet material S to provide a smooth cutting action in slitting the sheet material S.

The operation of one of the cutting blades 20 is best illustrated in FIG. 3. It will be noted that the peripheral edges of the plurality of side-by-side discs 12 cooperate to provide a smooth and continuous supporting surface for the sheet material S as it passes beneath the cutting blade 20. In addition, it will be noted that the cutting edge 20a of the cutting blade 20 is received by and wedged between two of the discs 12 without contact with the rotating shaft 11 and will continuously pass between the discs 12 as the cutting blade 20 and discs 12 rotate. Thus, the sheet material S is slit completely therethrough without unnecessary damage to the cutting blades 20, sheet material S, the plurality of discs 12, or the rotating shaft 11. Furthermore, the cutting apparatus 10 will function in an equivalent manner irrespective of the axial position of the cutting blades 20 on the rotating cutting blade shaft 21.

While the cutting apparatus has been described for slitting continuous elongate sheet material, it is readily apparent that material in other forms such as tubular and the like may be slit with the cutting apparatus of the present invention.

In the drawings and specification, there has been set forth a preferred embodiment of the invention, and although specific terms are employed, they are used in a generic and descriptive sense only and not for purposes of limitation.

What is claimed is:

1. A cutting apparatus for slitting material comprising an anvil means including a plurality of very thin discs coaxially mounted in side-by-side relation and means mounting said discs for resilient axial movement relative to each other, and at least one rotating cutting blade having a cutting edge on the outer periphery thereof and an axis of rotation substantially parallel to the axis of said discs and being superimposed in cooperative relationship with said discs for slitting material passing therebetween with said cutting edge of said cutting blade being received and wedged between two of said discs by axially moving said discs relative to each other and passing between said two discs as said cutting blade rotates.

2. The cutting apparatus, as set forth in claim 1 wherein said anvil means includes a rotating shaft slidably carrying said discs for resilient axial movement thereon and for rotation therewith.

3. The cutting apparatus, as set forth in claim 1, wherein said means mounting said discs for resilient axial movement relative to each other comprises a pair of compressible coil springs coaxially mounted on said rotary shaft at opposed ends of said plurality of discs and resiliently maintaining said discs in side-by-side relation.

4. The cutting apparatus, as set forth in claim 1, wherein said plurality of discs are from about .005 inch to about .010 inch thick whereby said discs are sufficiently thin that said cutting edge of said cutting blade may be received and wedged between two of said discs without substantial likelihood of abutting the outside edge of one of said discs.

5. The cutting apparatus, as set forth in claim 1, including a plurality of said cutting blades being spaced apart and coaxially mounted with respect to each other and with the cutting edges of each of said cutting blades being received and wedged between two of said discs by axially moving said discs relative to each other and passing between said discs as said cutting blades rotate.

6. The cutting apparatus, as set forth in claim 5, including a rotating cutting blade shaft disposed substantially parallel to the axis of said discs and adjustably carrying said cutting blades thereon for rotation therewith and for axial adjustment therealong.

7. A cutting apparatus for slitting material comprising an anvil means including a plurality of very thin annular discs of from about .005 inch to about .010 inch thick and coaxially mounted in side-by-side relation, a rotating shaft slidably carrying said discs for axial movement thereon and for rotation therewith, and a pair of compressible coil springs coaxially mounted on said rotary shaft at opposed ends of said plurality of discs for resiliently maintaining said discs in sideby-side relation but allowing resilient axial movement of said discs relative to each other, and cutting blade means comprising a plurality of rotating cutting blades having a cutting edge on the outer periphery of each and a rotating cutting blade shaft disposed substantially parallel to the axis of said anvil means and adjustably carrying said cutting blades thereon for rotation therewith and for axial adjustment therealong, and said cutting blades being in cooperative relationship with said discs for slitting material passing therebetween with said cutting edges of said cutting blades being received and wedged between two of said discs by axially moving said discs relative to each other and passing between said two discs as said cutting blades rotate regardless of the axially adjusted position of said cutting blades.

References Cited

UNITED STATES PATENTS 148,203    3/1874    Gardiner _____ 83—505 X

FOREIGN PATENTS 229,846    2/1944    Switzerland.

WILLIAM S. LAWSON, Primary Examiner

U.S. Cl. X.R.

83—500, 659